Oct. 24, 1939.  J. J. GOUGH  2,177,177
ELECTRIC TOASTER
Filed Oct. 3, 1938  2 Sheets-Sheet 1
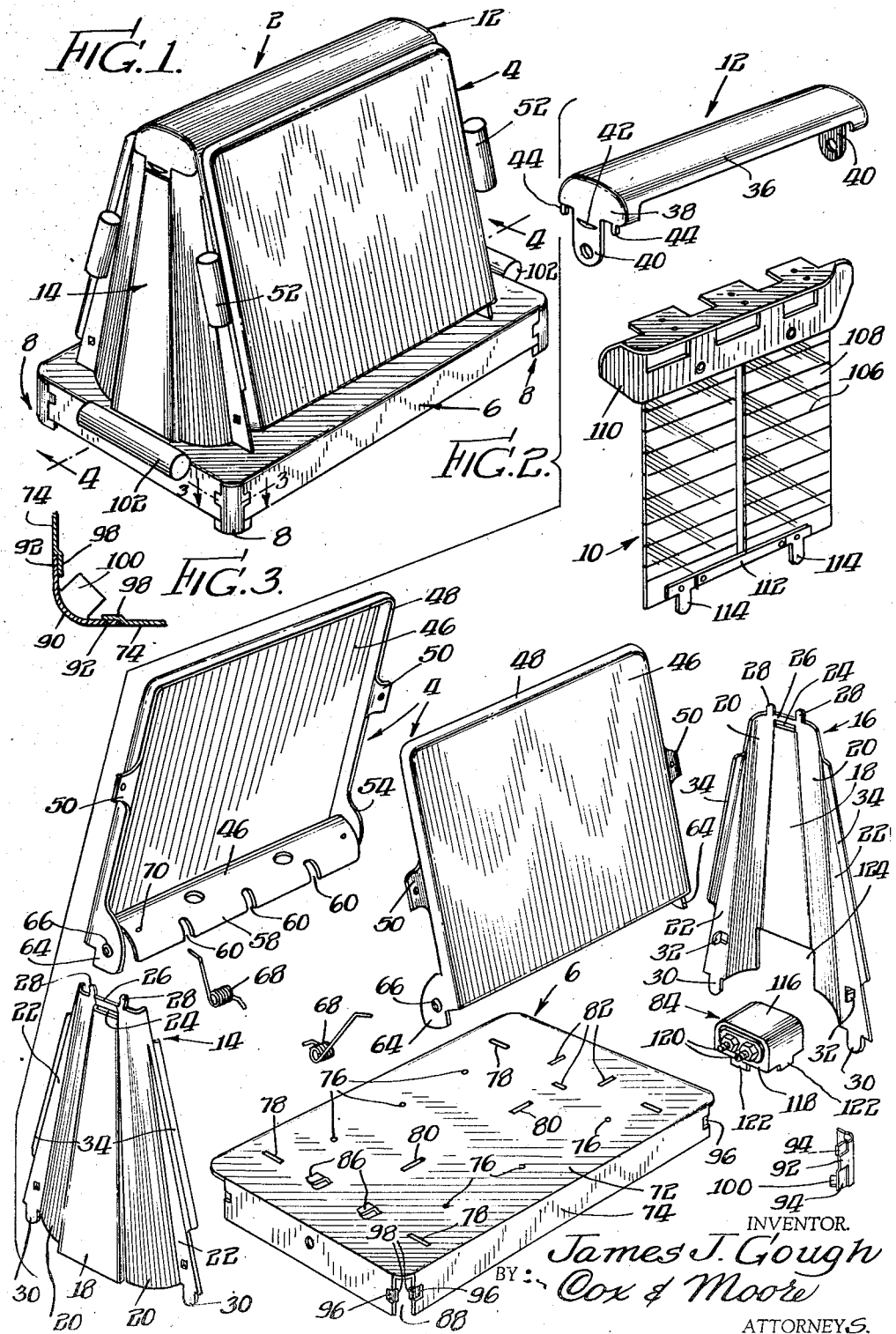
INVENTOR.
James J. Gough
BY Cox & Moore
ATTORNEYS.

Oct. 24, 1939.  J. J. GOUGH  2,177,177
ELECTRIC TOASTER
Filed Oct. 3, 1938  2 Sheets-Sheet 2
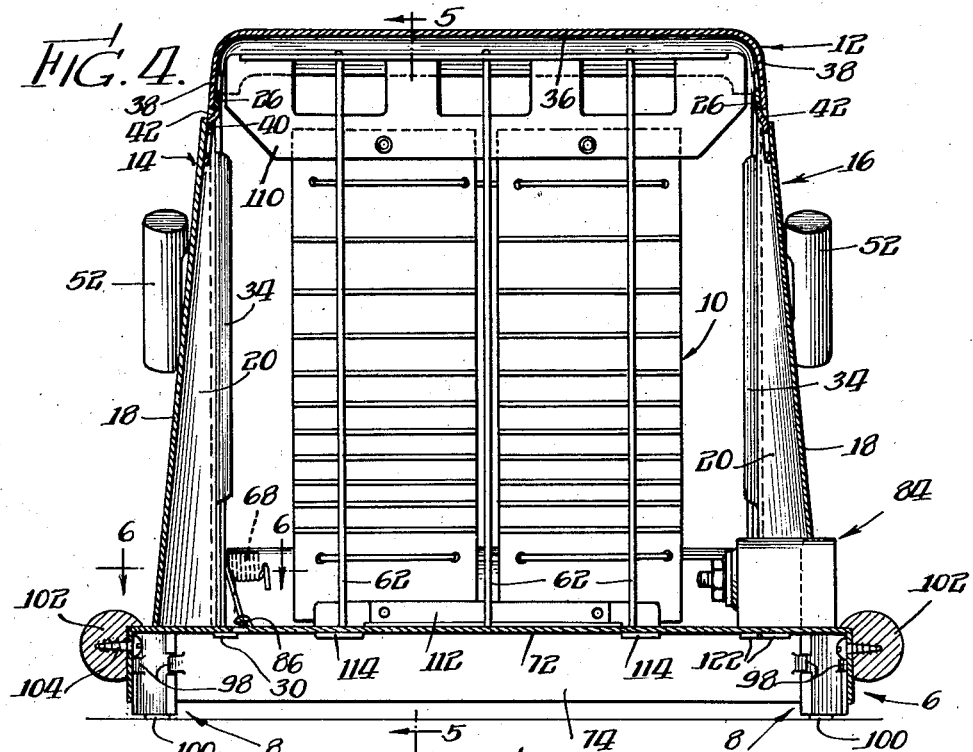
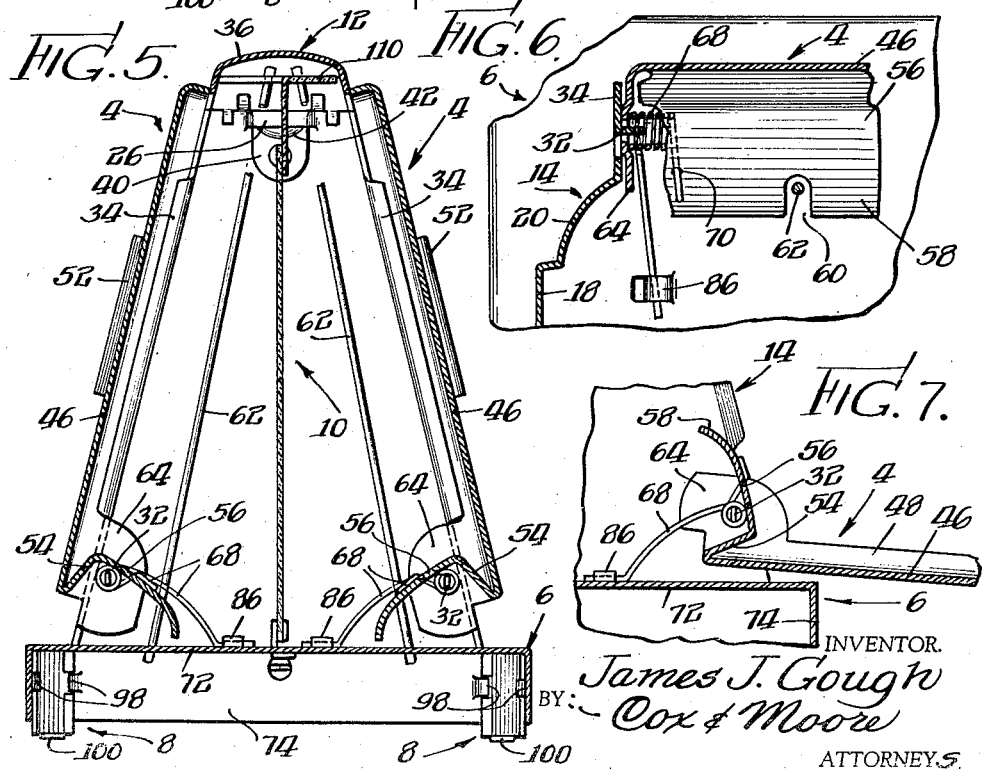
INVENTOR.
James J. Gough
BY Cox & Moore
ATTORNEYS.

Patented Oct. 24, 1939

2,177,177

UNITED STATES PATENT OFFICE 2,177,177

ELECTRIC TOASTER

James J. Gough, Chicago, Ill., assignor to Chicago Electric Manufacturing Company, Chicago, Ill., a corporation of Illinois Application October 3, 1938, Serial No. 232,949

10 Claims. (Cl. 53—5)

This invention relates to an electric toaster and more particularly to the construction of the constituent parts of the toaster frame and the mounting of the bread receiving doors or trays on the frame.

An object of the invention is to provide a simplified mounting for the bread receiving door or tray and its automatic closing means or spring whereby the closing means or spring will be concealed from view and protected against the accumulation thereon of crumbs from the bread being toasted.

Another object of the invention is to provide a toaster of which the constituent parts may be inexpensively formed and readily assembled at a minimum of expense.

A further object of the invention is to provide an electric toaster of the low mounted type in which the toaster supporting tray is of simplified construction, capable of inexpensive manufacture and in which the supporting members or legs for the tray may be produced by a simple stamping operation and readily, though securely, locked to the tray.

Other and further objects and advantages will be apparent from the following specification, when in connection with the accompanying drawings, wherein:

Fig. 1 is a view in perspective of an electric toaster embodying the invention;

Fig. 2 is an exploded view showing in perspective the constituent parts of the toaster of Fig. 1;

Fig. 3 is a fragmentary horizontal section taken substantially along the line 3—3 of Fig. 1;

Fig. 4 is a vertical section taken substantially along the line 4—4 of Fig. 1;

Fig. 5 is a vertical section taken along the line 5—5 of Fig. 4;

Fig. 6 is an enlarged, horizontal section taken along the line 6—6 of Fig. 4; and Fig. 7 is a fragmentary vertical section showing a portion of Fig. 5, but with the bread receiving door or tray in an open position.

As shown in the drawings for purposes of illustration, a toaster embodying the invention may comprise a frame 2, bread receiving doors or trays 4, a frame supporting tray 6, feet or supporting members 8 for supporting the tray 6, and an electric heating unit 10.

The frame 2 comprises a top section 12 and side sections 14 and 16. The side sections 14 and 16 each preferably comprise a sheet metal stamping having a central, shallow, channel-like portion 18 projecting outwardly from oppositely extending curved wings 20, merging into the plane surfaces or flanges 22. The central portion 18 is provided adjacent its upper end with the slot 24, the strip 26 defining the upper edge of the slot being offset in the plane of the edges of the wings 20 joined by this strip so as to form a lug receiving pocket for attaching the top to the side.

Spaced lugs 28, extending upwardly from the upper edge of each side section, are also offset inwardly so as to be received within the top to prevent outward movement of each side section relative to the top. The plane surfaces or flanges 22 are provided at their lower edges with depending lugs 30 for attaching the side section to the tray 6, and are also provided with struck out inwardly turned lugs 32, forming pivot mountings for the bread receiving doors or trays 4. The side sections 14 and 16 are each also provided with inwardly bent strips or flanges 34, forming side jambs against which the doors or trays abut when in closed position.

The top section 12 of the frame 2 comprises a sheet metal stamping providing a convex covering portion 36 and end portions 38, having depending lugs 40 for reception within the lug receiving prockets formed in the central portion 18 of each side section 14 and 16. The lugs 40 are provided with inwardly struck ribs or ridges 42 adapted to be sprung under the strips 26 and to engage the lower edge of these strips, so as to lock the top section against upward movement on the side sections. The end portions 38 are provided with additional depending lugs 44, offset slightly inwardly so as to engage the inner surface of the side sections 14 and 16 for further support, and to prevent wobbling of the top section relative to the side sections.

The bread receiving doors or trays 4 preferably comprise a sheet metal stamping providing a tray portion 46, having an inturned flange 48 extending peripherally about three sides of the tray. Lugs 50, bent outwardly from the flange 38 at the sides of the door, receive handles 52, riveted or otherwise secured to said lugs. At the bottom of each door the tray portion 46 is bent reversely, as at 54 (Figs. 5 and 7) and then outwardly to provide a bread supporting shelf 56. The bread supporting shelf 56 is turned downwardly at its outer free edge, as at 58, and is provided with spaced slots 60 to receive the guard wires 62 (Figs. 4 and 6) when the doors are in closed position so that when in this position the bread will be properly placed against the guard wires at the proper toasting distance from the heating element 10.

Each door or tray 4 is additionally provided at its lower edge with opposed, inwardly extending lugs or flanges 64, having openings 66 to receive the pivot lugs 32 formed on the side sections 14 and 16. It should be noted that the openings 66 in the flanges 64 are positioned below the bread supporting shelf 56 so that the pivot lugs 32 lie beneath and are covered by this shelf.

The automatic closing means for each bread receiving door or tray 4 comprises a coil spring 68 which is mounted on one of the pivot lugs 32 for the door. One end of the spring 68 passes through an opening 70 in the bread supporting shelf 56 and is bent over into engagement with the upper surface of this shelf so as to secure the spring to the door or tray. The other end of the spring is anchored to the base or tray 6.

The frame supporting tray 6 preferably comprises a sheet metal stamping providing an upper plane supporting surface or plate 72 and a peripherally extending flange 74. The plate 72 is provided with a plurality of spaced openings 76 to receive the guard wires 62, a plurality of slots 78 to receive the attaching lugs 30 formed on the side sections 14 and 16, a pair of slots 80 for receiving the attaching lugs of the heating unit 10, a plurality of slots 82 for receiving the attaching lugs of the terminal support or housing 84, and a pair of struck out, upwardly turned lugs 86 for anchoring the ends of the door closing springs 68 to the base 6.

The peripheral flange 74 of the base 6 is cut away or slotted at each corner of the base, as at 88, to receive the feet or supporting members 8. Each foot or supporting member 8 comprises a clip 90 curved in an arc of 90 degrees, and at its free edges offset inwardly above and below the portion 92, as at 94, to engage the inner surface of the flange 74 adjacent the edges of the corner opening 88. The portion 92 is therefore of shallow, channel shape in cross-section, and is received within slots 96 formed at the opposite edges of the opening 88 by struck out and inwardly bent lugs 98. The lugs 98 are bent over into clamping engagement with the inner surface of the shallow channel-shaped portions 92 of each clip 90. The clip 90 is additionally provided at its lower edge with an inwardly extending lug 100 for increasing the area of support offered by the clip.

Handles 102 may be secured at opposite ends of the base 6 in any desired manner, as for example by screws 104 or the like.

The electric heating unit 10 may be of any suitable or well-known construction, providing a heating element 106 wound about the insulating plate 108, supported between an upper T-shaped member 110 and a lower strap 112. The T-shaped member 110 is provided with spaced openings to receive the upper ends of the guard wires 62, which also support the heating unit on the base, and the lower supporting strap 112 is provided with spaced, depending lugs 114 which are received within the slots 80 of the base 6 and are bent over into clamping engagement with the under surface of the plate 72. The guard and supporting wires 62 are, in the customary manner, twister to provide slightly enlarged portions beneath the T-shaped member 110 and above the plate 72 so as to support the heating unit 10.

The terminal housing 84 preferably comprises a metal plate bent to form a substantially U-shaped cover 116 and an end flange 118 upon which the terminals 120 are insulatingly supported. The cover 116 and the flange 118 are provided with depending lugs 122 which are adapted to be received within the slots 82 of the base plate 72, and bent over into clamping engagement with the under surface of said plate.

The parts of the toaster above described may, during manufacture, be readily assembled substantially as follows: The heating unit 10 is first mounted in position on the base 6 by inserting the guard wires 62 between the T-shaped member 110 and the base plate 72, and by inserting the lugs 114 of the heating unit through the slots 80 in said plate, and then bending these lugs over into clamping engagement with the under surface of said plate. The side sections 14 and 16 of the frame 2 are then assembled on the base 6 by insertion of the lugs 30 in the slots 78 in the base plate 72, and then bending over these lugs into clamping engagement with the plate.

The top section 12 is then placed upon the side sections 14 and 16 by passing the depending lugs 40 through the slots 24 of the side sections and forcing the ribs or ridges 42 of these lugs into engagement with the lower edge of the strips 26 of the side sections. The doors or bread receiving trays 4 are then mounted on the side sections 14 and 16, the said sections having sufficient flexibility to permit the pivot lugs 32 to be moved out of position sufficiently to be inserted into the pivot openings 66 in the lugs 64 of the two doors.

With the doors in open position the springs 68 are placed in position on the pivot lugs 32 beneath the bread supporting shelves 56 and the shorter of the free ends of the springs are inserted through the openings 70 in the shelves. The other ends of the springs are then inserted beneath the outwardly projecting lugs 86 of the base plate 72, and the lugs then bent over to anchor the springs to the base 6.

The terminal supporting housing 84 is attached to the base 6 prior to the assembly of the frame 2, and is at that time electrically connected to the heating wire or element 106 of the heating unit. This housing is received within and passes through an opening 124 extending outwardly from the bottom edge of the side section 16 of the frame 2.

The handles 102 and feet 8 may be assembled on the base either before or after assembly of the frame, as desired, and in a manner apparent from the foregoing description. Preferably, the door handles 52 are riveted or otherwise secured to the doors prior to their assembly with the frame 2.

If desired, the frame 2 with doors 4 may be assembled prior to its assembly on the base or tray 6.

It will be apparent from the foregoing description that applicant has provided an electric toaster in which the closing means or spring is concealed from view and protected against accumulation thereon of crumbs from the bread being toasted, and of which the constituent parts may be inexpensively formed and readily assembled at a minimum of expense.

Changes may be made in the form, construction, and arrangement of the parts without departing from the spirit of the invention or sacrificing any of its attendant advantages, and the right is hereby reserved to make all such changes as fairly fall within the scope of the following claims.

The invention is hereby claimed as follows:

1. In an electric toaster, a frame, an article receiving tray shiftable from an open to a closed position relative to the frame, and automatic tray closing means, said tray having an article supporting shelf extending laterally from the supporting surface of the tray and over said closing means to prevent clogging of the closing means by fragments from the article being toasted.

2. In an electric toaster, a frame, pivot means extending from the frame, an article receiving tray mounted on said pivot for movement between an open and a closed position relative to the frame, spring means mounted on the pivot for automatically moving the tray to closed position relative to the frame, said tray having an article supporting shelf extending laterally from the surface of the tray over said spring means to form a protective cover for said spring means.

3. In an electric toaster, a frame comprising sheet metal top and side sections, said top section having portions depending from its opposite ends, said side sections having slots adjacent their upper edges, which slots are defined by offset portions forming with the slots pockets for receiving the depending end portions of the top sections.

4. In an electric toaster, a frame comprising sheet metal top and side sections, said top section having portions depending from its opposite ends, said side sections having slots adjacent their upper edges, which slots are defined by offset portions forming with the slots pockets for receiving the depending end portions of the top sections, and said depending end portions of the top section having each a laterally offset portion to engage an edge of the slot in the companion side section to lock the top section to said side section.

5. In an electric toaster, a frame comprising sheet metal top and side sections, said top section having portions depending from its opposite ends, said side sections having slots adjacent their upper edges, which slots are defined by offset portions forming with the slots pockets for receiving the depending end portions of the top sections, said depending end portions of the top section having each a laterally offset portion to engage an edge of the slot in the companion side section to lock the top section to said side section, said top section further having inwardly offset depending portions and said side sections having inwardly offset, upwardly extending portions adapted to engage the inner surfaces of said side and top sections respectively to prevent lateral shifting of said top and side sections.

6. In an electric toaster, a frame, pivot means extending from the frame, an article receiving tray mounted on said pivot for movement between an open and a closed position relative to the frame, spring means mounted on the pivot for automatically moving the tray to closed position relative to the frame, said tray having an article supporting shelf extending laterally from the surface of the tray over said spring means to form a protective cover for said spring means, a supporting base and means anchoring said spring means to the bread receiving tray and to the base.

7. In a device of the character described, a supporting base plate having a depending peripheral flange, a plurality of supporting members for said base, said flange being cut away at the corners of the base to receive said supporting members, said supporting members each comprising an angle piece for slidable insertion in the complementary corner opening and having means for automatically locking it to the flange of the base.

8. In a device of the character described, a supporting base plate having a depending peripheral flange, a plurality of supporting members for said base, said flange being cut away at the corners of the base to receive said supporting members, said supporting members each comprising an angle piece for slidable insertion in the complementary corner opening and cooperating means on the flange and each angle piece for interlocking the supporting members to the base.

9. In an electric toaster, a frame, a bread receiving tray mounted on the frame and shiftable from an open to a closed position relative thereto, a supporting base plate to which the frame is secured, said base plate having a depending peripheral flange, a plurality of supporting members for the base, said peripheral flange being cut away at the corners of the base plate to receive said supporting members, said supporting members each comprising a sheet metal clip for slidable insertion in the complementary corner opening, portions of the flange at each corner opening having recesses extending in from the opposed walls of said opening, said clips each having at its side edges relatively offset portions engaging the inner surface of the flange at the complementary corner opening and being received in the recesses in the opposed walls of said opening to interlock the clip to the peripheral flange.

10. In an electric toaster, a frame, a bread receiving tray mounted on the frame and shiftable from an open to a closed position relative thereto, a supporting base plate to which the frame is secured, said base plate having a depending peripheral flange, a plurality of supporting members for the base, said peripheral flange being cut away at the corners of the base plate to receive said supporting members, said supporting members each comprising a sheet metal clip for slidable insertion in the complementary corner opening, portions of the flange at each corner opening being struck out to provide recesses in opposed walls of said opening and inwardly offset projections, said clips each having at its side edges relatively offset portions engaging the inner surfaces of the flange at the complementary corner opening and being received in the recesses in the opposed walls of said opening to interlock the clip to the peripheral flange, said projections engaging the inner surface of the clip further to interlock the clip to the flange.

JAMES J. GOUGH.